United States Patent [19]
Johnson

[11] 3,988,059
[45] Oct. 26, 1976

[54] PROJECTOR
[75] Inventor: Philip M. Johnson, Windham, N.H.
[73] Assignee: Sanders Associates, Inc., South Nashua, N.H.
[22] Filed: June 23, 1975
[21] Appl. No.: 589,289

[52] U.S. Cl. ............................... 353/122; 353/99; 353/80
[51] Int. Cl.[2] ....................................... G03B 21/00
[58] Field of Search ............... 353/40, 62, 41, 28, 353/80, 121, 98, 99, 122; 33/286, 287; 350/113; 250/215; 240/3, 41.35 C, 41.35 D, 41.35 E; 356/141, 172

[56] References Cited
UNITED STATES PATENTS

| | | | |
|---|---|---|---|
| 2,602,326 | 7/1952 | Russonberger | 350/154 |
| 3,129,335 | 4/1964 | Stewart | 33/287 |
| 3,439,988 | 4/1969 | Breske | 353/122 |
| 3,600,077 | 8/1971 | Paiva | 353/40 |
| 3,638,692 | 2/1972 | Carter | 353/80 |
| 3,706,284 | 12/1972 | Plasser | 33/287 |
| 3,807,846 | 4/1974 | Swonk | 353/40 |

Primary Examiner—Harry N. Haroian
Attorney, Agent, or Firm—Louis Etlinger; Robert K. Tendler

[57] ABSTRACT

A wide angle projector is disclosed for projecting an image having an illuminated and unilluminated region on either side of a straight boundary region which defines a datum plane established by the orientation of the projector. The image is detected at a position removed from the projector by an instrument which establishes the center of the boundary region and indicates its position to indicate the position of the datum plane. The wide angle projection is accomplished by the use of cylindrical reflecting optics bounded by reflecting sidewalls and a reticle in the form of an occluding knife edge or a knife edge at the edge of a reflecting surface, depending on the particular projection system utilized.

17 Claims, 11 Drawing Figures

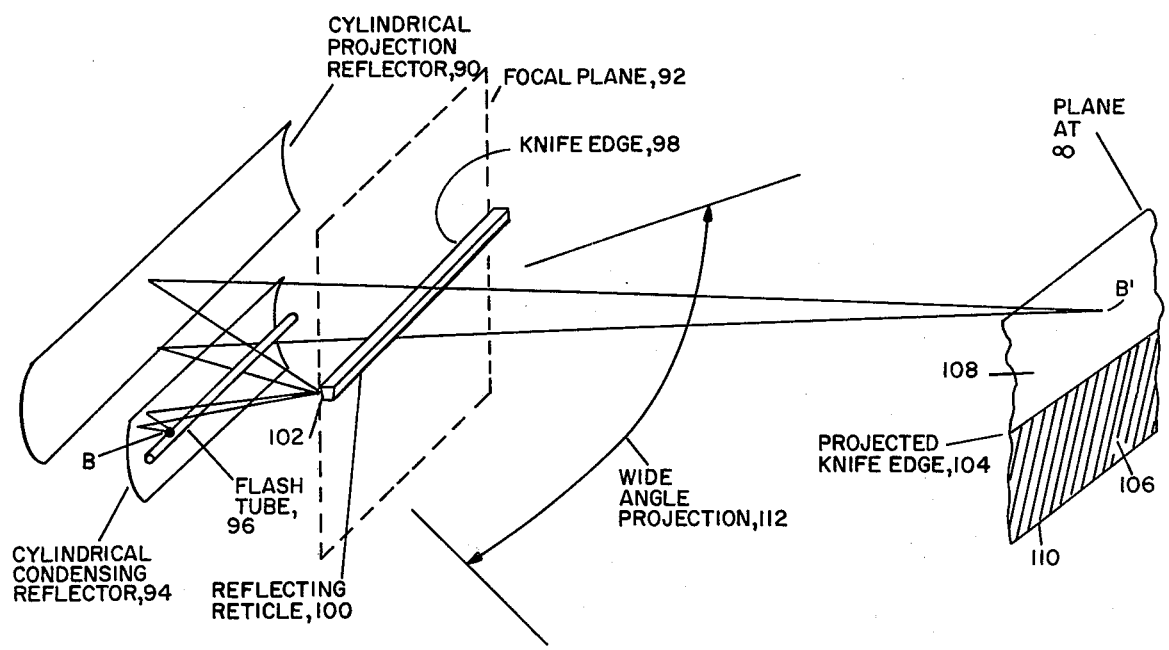
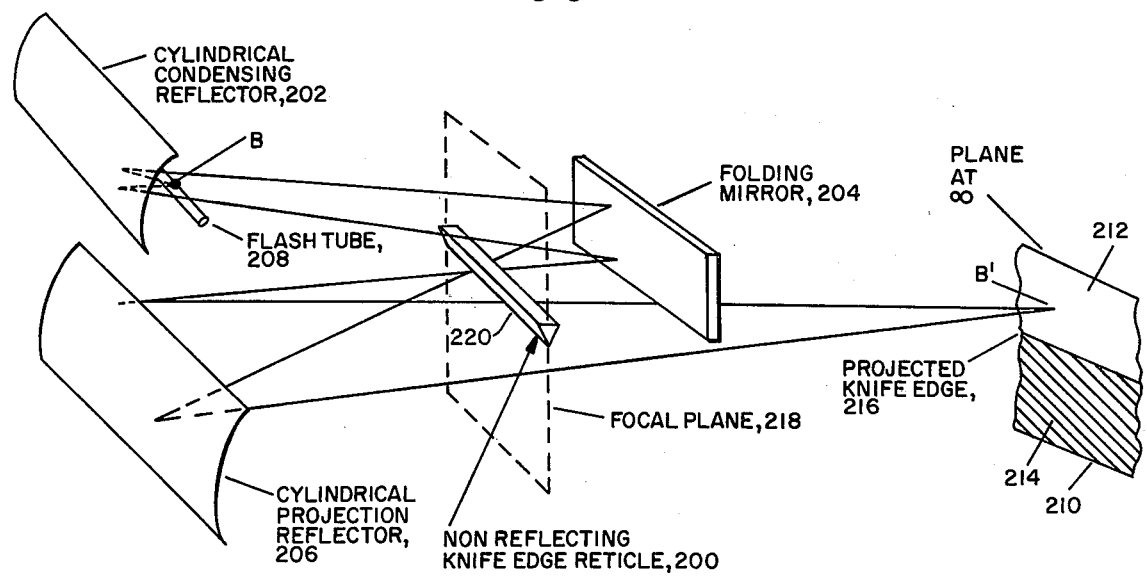

PROJECTOR

FIELD OF THE INVENTION

This invention relates to surveying instruments and more particularly to a wide angle projector for projecting an image having illuminated and unilluminated regions on either side of a boundary region which defines a predetermined datum plane.

BACKGROUND OF THE INVENTION

In surveying and building construction it is often necessary to establish a datum plane which is a predetermined height above the existing terrain or, for instance, the floor of a building. Once this datum plane is established measurements can be made from this datum plane to accurately position building structures or, in the case of excavation, to establish a reference plane for a grading operation. Moreover it is sometimes useful to establish a vertical datum plane at a given location.

In the past, the datum plane has been established with the use of a transit and level rod which requires personnel both at the transit and at the level rod. As will be appreciated communication must be established between the two people manning respectively the transit and the level rod. This is, of course, a time consuming process which has to some extent been alleviated by the use of rotating lasers, the beams of which sweep an area to establish the datum plane. However, in addition to the expense of the laser system and the mechanical stability of the rotating laser, a serious problem is finding the laser beam at a point removed from the laser. When the laser is utilized in a darkened room this may be easily established. When the laser is used out of doors, establishing the position of the laser beam is difficult at the permitted laser output levels due to background radiation. If the output power of the laser could be increased without damage to the human eye, then location of the sweeping laser beam would become less difficult. However, no inexpensive "eye-safe" yet highly visible laser presently exits.

The problem of establishing a datum plane over a wide area is solved in the present invention without the use of lasers. As discussed in connection with U.S. patent application Ser. No. 492,633 filed July 29, 1974 by Philip Johnson and Richard Northrup, hereby incorporated by reference, the projection of an image having a straight boundary region by use of a flash lamp and projecting optics provides an image which can be detected at two spaced points, and apparatus is provided for utilizing the signals from two spaced detectors at these points to determine the center of the boundary region extremely accurately. This establishes the datum plane set up by the projector. The detection of the center of the boundary region, in one embodiment, is accomplished by maintaining one of the detectors within the illuminated region of the image while moving the other detector across the boundary region until such time as the level from the detector moved across the boundary region is ½ that of the detector which is in the illuminated region. In this manner, although the boundary region may be somewhat ill-defined, its center is very accurately defined by the position of the detector at the time that the ratio between the two detectors is 1/2. As described in the aforementioned patent application, accuracies of ±1/8 of an inch at 1,000 feet are achieved. Moreover, the system is unaffected by range and source intensity since the detector in the illuminated region is used as a reference level detector, to which the output of the other detector is compared. In some cases where reduced accuracy is acceptable, such as ±½ inch at 500 feet, determinations of the datum plane may be made visually, without a receiver. This is accomplished by the observer moving his head until the light flashes from the projector start to go out.

While the projector illustrated in connection with the above mentioned patent application provides for adequate image projection, it is desirable to provide a wider angle of illumination to prevent the necessity of moving the projector to accomodate various positions. While wide angle lenses may be provided for the required coverage, wide angle lenses in general suffer from both cost and limitations on the aperture size. It will be appreciated that when the subject system is utilzed out of doors, in order to have an effective range of over 1,000 feet it is necessary that as much of the light from the source, in one instance a xenon flash lamp, be utilized as possible. The limitation on aperture size for wide angle lenses in some instances precludes their use over such long distances.

Wide angle projection of an image is solved in the present invention by providing a line source and cylindrical reflecting optics with ends bounded by reflecting walls. Cylindrical reflective optics, as opposed to cylindrical refractive optics, are used because of the non-linearity of refractive optics, while reflecting optics are linear. Interposed in the path between cylindrical reflectors is a reticle which may either take the form of a non-reflective occluding knife edge or a knife edge which also includes a reflective portion. By use of the cylindrical optics almost the entire portion of the line source is focused at infinity along with the image provided via the reticle, and this takes place over beam angles exceeding 90° and in some cases as much as 120°. Thus the beam width of the projector may be as much as 120° and rotating of the projector will be unnecessary to provide the necessary datum plane.

However, if 360° coverage is required, because of the mechanically stable projector package to be described, the entire package may be spun about a vertical axis while still maintaining the accuracy required. The projector is exceedingly simple, and the requirements, unlike those for the operation of a laser, are easily met both in the stationary and rotating cases.

In an additional embodiment, the subject invention encompasses a reflecting reticle in which the reflecting surface is contoured for maximum utilization of the flash lamp source. In a still further embodiment, a non-obscurring reticle is utilized with cylindrical reflecting optics having either a parabolic or a circular cross section. In the latter case, the cylindrical main projection reflector is tilted to alleviate any aberrations caused by the circular cross section. In a still further embodiment, in order to alleviate any visual ambiguity as to the boundary region intended, color coding is utilized to identify an irregular diffuse boundary region which should be avoided.

It will be appreciated that the subject projector is primarily intended to be utilized in connection with the aforementioned boundary region detecting apparatus described in the aforementioned patent application. Since this apparatus determines the center of the boundary region of the image projected, it is possible to use low quality optics in the projection system, since any blurring of the projected boundary region will be compensated for by the method of detecting. The use of low quality optics while achieving the necessary accuracy permits the fabrication of an exceptionally low cost projector. Visual use is also possible at lower accuracy.

It is therefore an object of this invention to provide an improved wide angle projector for projecting an image having a boundary region over a wide angle.

It is another object of this invention to provide a projector for projecting an image having a boundary region in which cylindrical reflecting optics are utilized.

It is another object of this invention to provide a low cost, mechanically stable, wide angle projector utilizing cylindrical reflecting optics, reflective side walls, and a knife edge reticle for establishing the boundary region.

It is a yet still further object of this invention to provide a number of different reticles for the subject wide angle projector.

It is a still further object of this invention to provide a projector which utilizes a non-obscurring reticle and cylindrical reflecting optics having a parabolic or circular cross section.

It is a yet still further object of this invention to provide a color coding method and apparatus for eliminating any visual ambiguity between the correct boundary region and an incorrect boundary region.

These and other objects of this invention will be better understood in connection with the detailed description of the drawings, in which:

BRIEF DESCRIPTION OF THE DRAWINGS

FIG. 3 is a diagramatic representation of the cylindrical reflecting optics utilized in one embodiment of the subject invention in which a reflecting reticle is utilized;

FIG. 10 is a diagramatic illustration of another embodiment of the subject invention in which a folding mirror and an occluding reticle are utilized.

DETAILED DESCRIPTION

Figure 1:
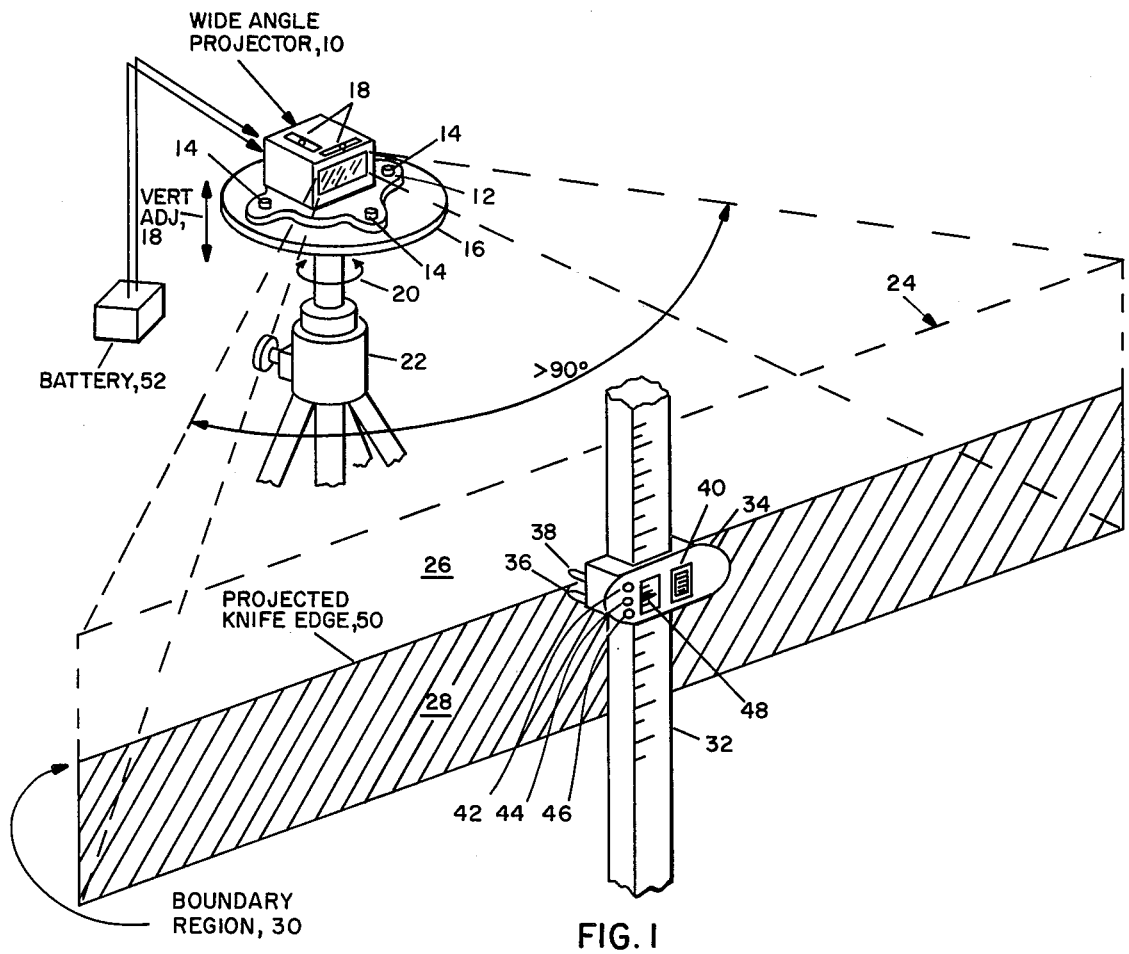
FIG. 1 is a diagramatic representation of the subject wide angle projector for projecting an image into space which is detected at a point removed therefrom by detection apparatus which establishes the center boundary region projected.

Referring now to FIG. 1, a wide angle projector 10 is illustrated supported on a level stand 12 having adjustment screws 14 which co-act with a base 16 to level the projector in orthogonal directions defined by bubble levels 18 mounted on the top of the projector case. Base 16 adjustable vertically as indicated by double ended arrow 18 and may be swivelled in a horizontal direction as indicated by double ended arrow 20. The projector is mounted on a conventional tri-pod 22 which is set up at one location such that projector 10 projects an image generally indicated by the reference character 24 to a second location. This image is characterized by an illuminated region 26 and an unilluminated region 28 with a straight boundary region 30 therebetween. A level rod or like device 32 is provided at the remote location with a boundary region detecting device 34 mounted thereon and adjustable vertically. This detector is more fully described in the aforementioned patent application incorporated herein by reference. Detector 34 generally includes two spaced detectors 36 and 38 which are mounted for movement with detector 34 via thumb screw 40. Mounted on the face of detector 34 are indicator lights 42, 44, and 46 indicating respectively whether detector 36 is above the center of the boundary region, at the center of the boundary region, or below the center of the boundary region. When indicator light 44 is on, by virtue of the fact that an indicator bar having an edge 48 indicates the position of detector 36, it indicates the center of the boundary region 30.

Boundary region 30 is established by projector 10 which includes cylindrical reflecting optics and a knife edge reticle to be described hereinafter. By virtue of the knife edge reticle a projected knife edge 50 establishes a predetermined datum plane at a position remote from the projector. In the embodiments to be described the projector also includes a xenon flash lamp for providing a source of illumination which is powered by battery 52.

In order for the projected image to be useful as possible it must be as wide as possible at the remote location with uniform intensity. For a sufficiently wide image, projector 10 may be set up to project the image in a general direction and can be left unattended while work is commenced at the remote location. This wide angle projector, which is the subject matter of this patent will be described hereinafter.

Figure 2:
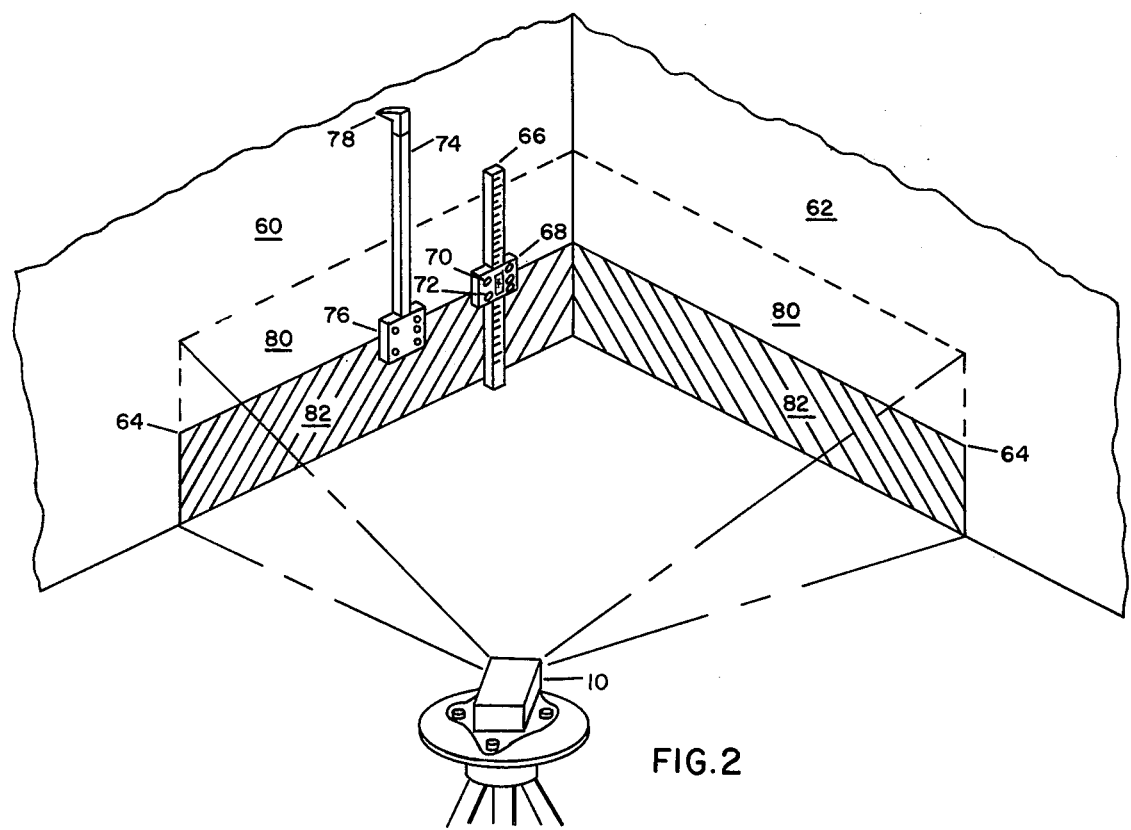
FIG. 2 is a diagramatic representation of the use of the subject wide angle projector in a closed region such as a room.

Referring to FIG. 2, the subject projector may also be located within a room generally bounded by walls 60 and 62 such that a datum plane is defined by the projected image on a wall. This is indicated by the projected knife edge 64. This knife edge is detected either by use of a level rod 66 having a receiver 68 with detectors 70 and 72 mounted on the face thereof, or the knife edge may be detected by a hand held level rod 74 having the same kind of receiver mounted thereon and having a pointer or marker 78 whose distance from the detector which detects the boundary is readily adjusted. As will be appreciated knife edge 64 is bounded by an illuminated region 80 on one side and an unilluminated region 82 on the other side.

The aforementioned wide angle capability of the projector is now described in connection with FIGS. 3–5 for whar is herein referred to as being the reflecting reticle embodiment of the subject invention. Referring now to FIG. 3 the subject projector includes a cylindrical projection reflector 90 which is generally parabolic in cross section in a preferred embodiment, although a circular cross section may also be used. The focal plane established by this projection reflector is illustrated in dotted outline by the reference character 92. Beneath projection reflector 90 is a cylindrical condensing reflector 94 which has an ellipsoidal cross section in the preferred embodiment. A xenon flash tube 96 is positioned at one of the foci of the condensing reflector with the other focus of the condensing reflector establishing the position of a straight knife edge 98 of a reflecting reticle 100 whose knife edge lies in the focal plane of the projection reflector. Reticle 100 has a planar reflecting surface 102 which reflects light focused on it from the condensing reflector and reflects this light towards the projection reflector. As will be described a certain portion of the light from the flash tube is reflected via the reticle to the projection reflector while another portion of the light from the flash tube arriving above the knife edge is not reflected, focused or projected. This results in the projection of the image 104 of knife edge 98 which forms the boundary between an unilluminated region 106 and an illuminated region 108 at a location sufficiently removed from the projection reflector. The projected image is illustrated at plane 110 which is ideally located at infinity. Light from a point B on the flash tube is reflected towards the projection reflector and thence focused at a point B' at plane 110. While the optical system thus described results in exceptionally wide angle projection as indicated by double ended arrow 112, as one measures the intensity of the image away from the optical axis of the system it will be apparent that intensity of the image falls off rather dramatically at large distances from this optical axis. While the optical system described in FIG. 3 may be utilized in certain instances, as described in connection with FIG. 5, if the projector is provived with reflective sidewalls, uniform intensity may be achieved over a wide angle.

The operation of the optical system described in FIG. 3 will now be further described in connection with FIG. 4 along with the description of the housing for mounting the optical elements.

Figure 4:
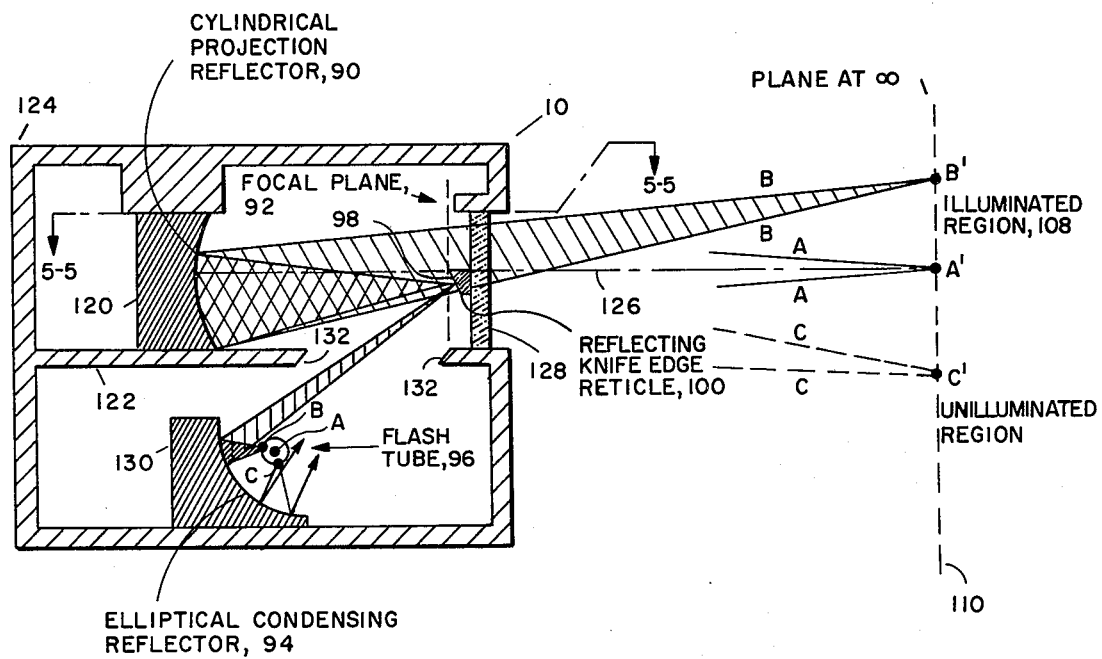
FIG. 4 is a sectional diagram illustrating one embodiment of the projector diagramatically illustrated in FIG. 3.

Referring now to FIG. 4, cylindrical projection reflector 90 of FIG. 3 may be formed in a block 120 of plastic, glass, metal, or the like, mounted on a shelf 122 of an enclosed housing which may be of any type rigid molded material and is generally indicated by reference character 124. In one embodiment the housing and mountings preferably are made of cast aluminum for low cost and good thermal properties in that the aluminum conducts heat well so as to minimize differential heating from sunlight which may cause warping. The cylindrical projection reflector in one embodiment has a parabolic cross section, with the optical axis of the projection reflector indicated by axis 126. As can be seen, reflecting knife edge reticle 100 is mounted on a window 128 in housing 124 such that knife edge 98 is located at the junction of optical axis 126 and focal plane 92.

Elliptical condensing reflector 94 may be formed in a block 130 of plastic, glass, metal, etc. mounted within housing 124 such that light from reflector 94 is projected through an aperture in shelf 122 defined by surfaces 132. The center of flash tube 96 is illustrated by reference character A and is at one of the foci of elliptical reflector 94. The other of the foci of this reflector is located at point 98 such that light from the central axis of the flash tube is focused at point 98 and is reflected towards the projection reflector to establish the optical axis 126 and a point A' at plane 110 which is the aforementioned knife edge image.

For purposes of explaining the generation of the far field image, a point B is established on flash tube 96 such that light from this point is focused by reflector 94 onto a portion of the reflecting surface of reticle 100 with the light beam being shaded as illustrated. This light beam is reflected towards the projection reflector 90 where it is focused to a point B' in the illuminated region 108 at plane 110.

Light from a point C from flash tube 96 is reflected towards reflector 94 but is not reflected at reticle 100 since it passes above edge 98 of the reticle. Since the light is unfocused and lost, it does not contribute to the illumination at plane 110. Were reticle 100 extended upwardly and towards the parabolic reflector a point C' would be established at plane 110 which would be illuminated rather than being unilluminated as in the present case.

Figure 5:
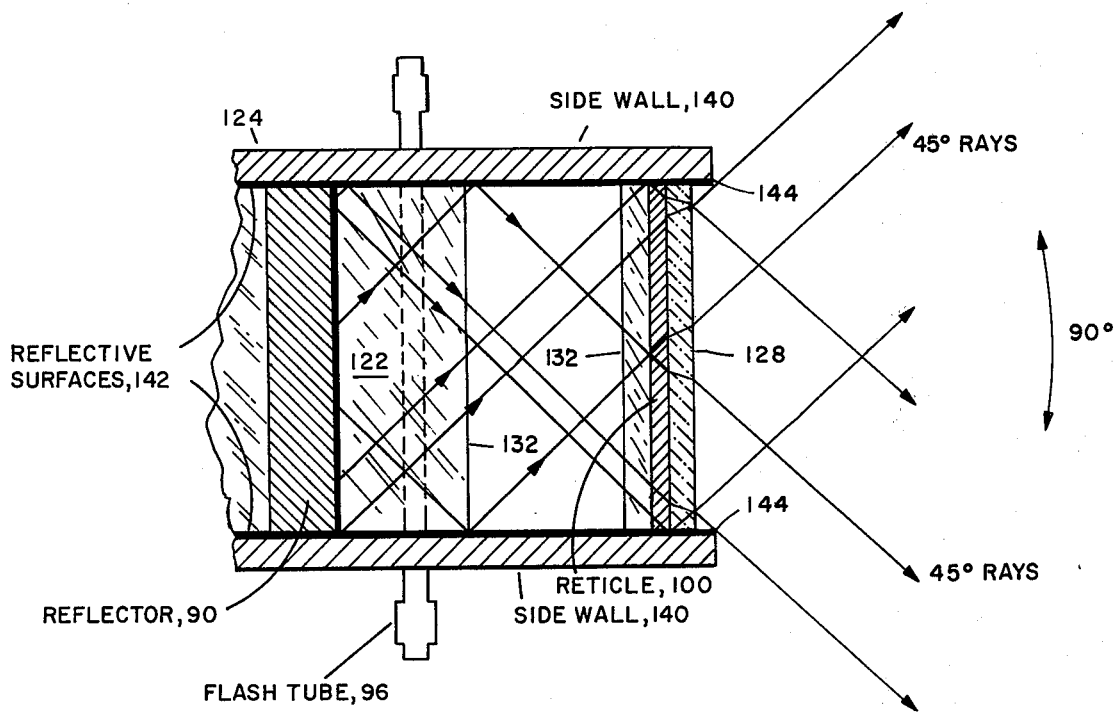
FIG. 5 is a top sectional view of the apparatus of FIG. 4 illustrating the uniform intensity wide angle projection obtainable.

The wide angle projection with uniform illumination across this wide angle is illustrated in FIG. 5 in which elements which are the same as those in FIG. 4 carry like reference characters. In this view, housing 124 has two parallel sidewalls 140 which are provided with reflective surfaces 142 such that any light emanating from reflector 90 is reflected back and forth between the walls until it exits window 128. The 45° rays to either side of the optical axis are those which are illustrated. It will be appreciated that within the bounds of the outer rays defined by edges 144 almost all of the light from the flash tube will be made available in the far field so that the projected image will be uniform. With angles greater than 45° off axis the light will fall off in a predetermined manner such that although nearly uniform illumination may be obtained across a 90° sector, sufficient illumination may be obtained at much greater angles. Since the boundary region detection system described hereinbefore does not depend on the absolute amplitude or intensity of the transmitted image at a remote location, the projector has a useful beam width of 120° and greater for ranges of up to 1000 feet.

As mentioned hereinbefore, because of the method of boundary region detection, the quality of the optics need not be high. Although the optical system described focuses the knife edge at infinity datum plane boundary determinations can be made as close as 10 feet to the projector.

Figure 6:
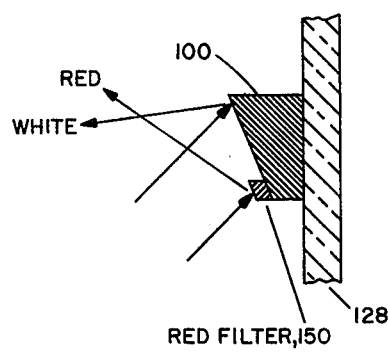
FIG. 6 is a sectional view of the reflecting reticle for use with the subject invention; also illustrating the position of a colored filter for visual boundary ambiguity rejection.
Figure 8:
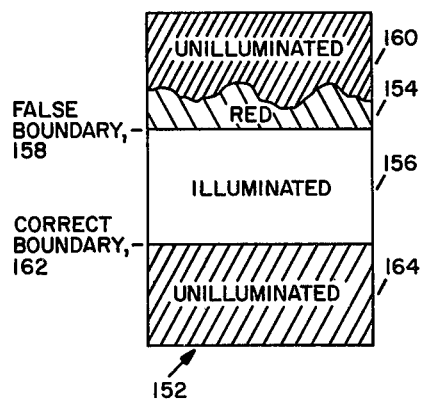
FIG. 8 is a diagramatic illustration of the image projected with the reticle of either FIG. 6 or FIG. 7 illustrating how to distinguish between a correct boundary and a false boundary via projection of a colored region at the false boundary for the case of visual detection.
Figure 11:
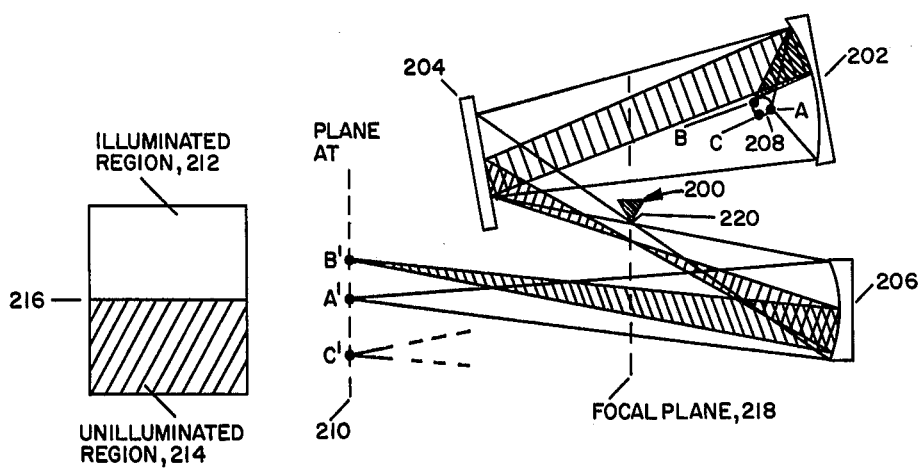
FIG. 11 is a further diagramatic illustration of this second embodiment, illustrating the derivation of the optical axis of the system as well as the illuminated region of the image projected.

It will be appreciated from inspection of the projector of FIG. 4 that in addition to the projection of the image described in which the upper portion is the illuminated region and the lower portion is the unilluminated region, there will be an additional unilluminated region above the illuminated region corresponding to the blockage of radiation by the top of the aperture of the projector or corresponding to the limited extent of the reflecting surface of the knife edge reflector 100 on the side away from the sharp edge 98. Because of this blockage there will be a ragged, ill-defined boundary region above the illuminated region. This is not ordinarily a problem because the detector hereindescribed requires that the reference detector be in the illuminated region. As the detector is moved upwardly the reference detector moves out of the illuminated region into the upper unilluminated region and the "too high" lamp will be lit indicating that the detector must be moved downwardly. However, the observer may become confused if he forgets whether the illuminated region is above the prescribed unilluminated region or vice versa. In order to alleviate this confusion, as illustrated in FIG. 6 reticle 100 may be provided with a colored filter 150, in this case a red filter, at the bottom of the reflecting surface of the reticle. This results, as illustrated in FIG. 8, in a projected image 152 having a red region 154 above illuminated region 156 with the false boundary, herein illustrated by reference character 158, separating red region 154 and the top unilluminated region 160. This establishes the correct boundary as that boundary 162 between the illuminated region 156 and an unilluminated region 164 since the red region establishes the false boundary. The red region also defines the orientation of the projected image. This technique may also be used with the knife edge non-reflecting reticle to be described in connection with FIGS. 10 and 11 by merely placing the red filter in the focal plane of the main projector reflector.

Figure 7:
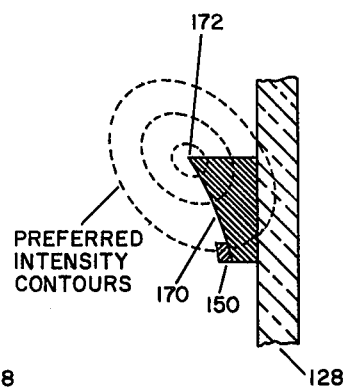
FIG. 7 is a sectional view of a modified reticle for use with the subject system which maximizes light collection from the flash lamp.

Reticle 100, as illustrated in FIG. 7, may be provided with a slightly concave surface 170 to act as a field mirror. The purpose of the field mirror is to more efficiently concentrate that portion of the radiation from the source which is slightly removed from one of the foci of the condensing reflector. It will be appreciated that there will be light from the source which does not emanate exactly from its center and some of this light will not impinge on the projecting reflector. By giving the reflecting surface of the reticle slight circular curvature this light, which would ordinarily be lost, is directed towards the projection reflector. In the preferred embodiment, the curvature will be circular with the radius of curvature being approximately the distance of the reticle to the condensing reflector. This, in effect, images the condensing reflector onto the projection reflector.

It is also useful, for maximum efficiency, to have the radiation pattern from the condensing reflector with the intensity contours illustrated in FIG. 7. As will be seen the majority of the light is focused on the knife edge reticle 100, and less passes by the reticle. The preferred intensity contour of FIG. 7 is provided by shifting the position of the xenon flash lamp slightly so that the center of the image of the flash lamp is well on the reticle.

Figure 9:
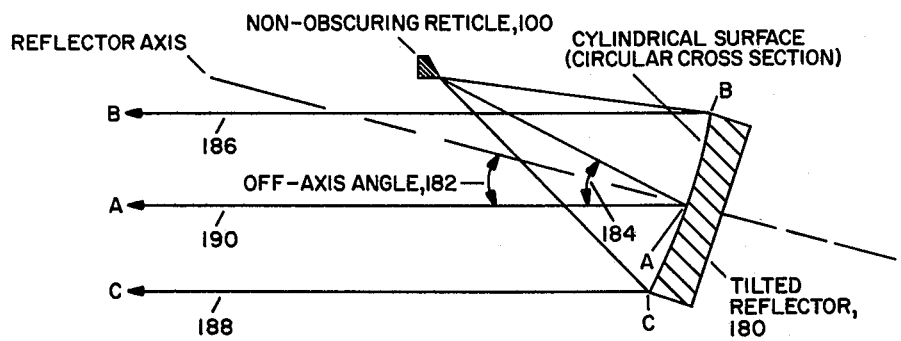
FIG. 9 is a diagramatic illustration of a non-obscurring knife edge reticle utilized in conjunction with aa tilted cylindrical reflector having a circular cross section, with image unbalance correction.

As mentioned hereinbefore, the projecting reflector in the preferred embodiment has a parabolic cross section. As is well known, a parabolic reflector can be approximated to a certain degree by the use of a reflector having a circular cross section. This introduces certain abberations which are averaged out by the receiver for a projection reflector oriented equally above and below to the optical axis. However, this requires locating the reticle in the clear aperture of the projection reflector. To alleviate this problem as illustrated in FIG. 9, reticle 100 may be located in a position so as not to obscure the light from the projection reflector. If a projection reflector of parabolic cross section is utilized there will be none of the aforementioned abberations. However, if a projection reflector with a circular cross section is utilized with the off axis reticle, unsymmetrical abberations will occur and will affect the position of the projected boundary region. In order to solve this problem, the circular cross section projecton reflector is tilted upwardly as illustrated by tilted reflector 180 at an off axis angle 182 which is equal to half the angle 184 subtended by the ray from the reticle to the center of the reflector and the ray representing the desired projection axis. In so doing a ray from the reticle impinging on the tilted mirror at B will result in a ray 186 which will be slightly high; whereas a ray from the reticle to the bottom of the tilted reflector at C will result in a ray 188 which will be slightly low. These abberations will substantially cancel at the receiver, which will receive rays A, B, C, thereby eliminating the abberation problem when non-obscurring reticles are utilized and when the projection reflector is given a circular cross section. As mentioned, the reflector need not be tilted if it is given a parabolic cross section.

What has therefor been described is a projector utilizing cylindrical reflecting optics and a reflecting reticle to produce a wide angle image having a sharp projected knife edge boundary. Referring to FIG. 10, a non-reflecting knife edge reticle 200 may be utilized with reflecting cylindrical optics including a cylindrical condensing reflector 202, a folding mirror 204, a cylindrical projection reflector 206, and a longitudinally extending flash tube 208. This system also projects an image at infinity, illustrated by plane 210, which includes an illuminated region 212 and an unilluminated region 214 separated by a projected knife edge image 216. The non-reflecting knife edge reticle is located at the focal plane 218 of the cylindrical projection reflector 206. This results in a projected point B from a point B on the flash tube 208. The optics of this system are described in FIG. 11 in which like elements carry like reference characters.

In this embodiment, condensing reflector 202 is also elliptical in cross section, with a point A at one focus of the ellipse. The other focus is located at focal plane 218. As can be seen from the rays emanating from point A they are reflected and folded by mirror 204 and establish a point A' at plane 210 to establish the optical axis of the system. In this example reflector 206 is given a parabolic cross section. Radiation from a point B on the flash tube is reflected below knife edge 220 and is therefore not blocked by it. This light estabishes the B' point at plane 210. Radiation from a point C on the flash tube is reflected by mirror 204 but is blocked by the side of the knife edge and therefore never reaches the C' location at plane 210. In this manner a straight boundary region 216 is formed in the far field.

As can be seen, subject invention can take on a number of configurations in which cylindrical reflecting optics arre utilized with a number of different reticles to project a highly defined knife edge boundary region at a distance removed from the projector. The cylindrical optics permit the projection of a line source and the reflective optics make use of the little known fact that reflective cylindrical optics do not suffer the same problem of resolution loss with field angle as do refractive cylindrical optics. This is because refraction is a non-linear process while reflection is a linear process in terms of the relation between the angles of incoming and outgoing rays. The reflective side walls described herein may be utilized to provide uniform illumination over a wide angle or these reflective walls may be omitted with the expected dropoff in intensity at, for instance, an angle of 30° away from the optical axis.

Although a preferred embodiment to the subject invention has been described in considerable detail for illustrative purposes, many modifications will occur to those skilled in the art. It is therefore desired that the protection afforded by Letters Patent be limited only by the true scope of the appended claims.

I claim:

1. Apparatus for projecting over a wide angle an image having an illuminated and unilluminated region with a boundary region therebetween comprising:
 a line source of light having a finite thickness;
 an elongated reticle having a line portion defining said boundary region;
 means for focusing the light from said line source so as to form an image of said line source substantially coextensive with and colinear with the line portion of said reticle such that said reticle permits transmission of only a portion of light from said line source; and
 reflective focusing means elongated in one dimension so as to have a locus of focal points extending in the direction of the line portion of said reticle for focusing the light permitted to be transmitted by said reticle at infinity such that an image having an illuminated and unilluminated region and a well defined boundary region therebetween exists over a wide angle at a substantial distance from said apparatus.

2. The apparatus of claim 1 wherein said first mentioned focusing means includes means for focusing light from said line source with reflective optics elongated in the direction of said line source.

3. The apparatus of claim 1 wherein said reflective means includes a reflective surface having a parabolic cross section.

4. The apparatus of claim 1 wherein said reflective means includes a reflective surface forming a portion of a circle in cross section.

5. The apparatus of claim 1 wherein said boundary region is straight.

6. Apparatus for projecting over a wide angle an image having an illuminated and unilluminated region with a boundary region therebetween comprising:
 a line source of light having a finite thickness;
 a reticle, a portion of which defines said boundary region;
 means for focusing said line source on to a portion of said reticle such that said reticle permits transmission of only a portion of light from said line source; and
 reflective focusing means elongated in one dimension so as to have a locus of focal points extending in the direction of said reticle for focusing the light permitted to be transmitted by said reticle at infinity such that an image having an illuminated and unilluminated region and a well defined boundary region therebetween exists over a wide angle at a substantial distance from said apparatus, wherein said reflective focusing means includes a surface having an elliptical cross section, with said line source at one focus of the ellipse and the portion of the reticle defining said boundary region at the other focus.

7. The apparatus of claim 6 wherein said portion of the reticle defining said boundary region lies in the focal plane of the reflective means for focusing light from said portion of the reticle.

8. Apparatus for projecting over a wide angle an image having an illuminated and unilluminated region with a boundary region therebetween comprising:
 a line source of light having a finite thickness;
 a reticle, a portion of which defines said boundary region;
 means for focusing said line source onto a portion of said reticle such that said reticle permits transmission of only a portion of light from said line source; and
 reflective focusing means elongated in one dimension so as to have a locus of focal points extending in the direction of said reticle for focusing the light permitted to be transmitted by said reticle at infinity such that an image having an illuminated and unilluminated region and a well defined boundary region therebetween exists over a wide angle at a substantial distance from the apparatus, wherein said reticle includes a reflective surface for redirecting a portion of the light from said line source to said reflective focusing means.

9. The apparatus of claim 8 wherein said reflective surface is planar.

10. The apparatus of claim 8 wherein said reflective surface is concave.

11. The apparatus of claim 10 wherein said concave surface has a circular cross section.

12. The apparatus of claim 8 and further including a colored filter adjacent a portion of said reflective surface removed from the portion of said reticle defining said boundary region.

13. Apparatus for projecting over a wide angle an image having an illuminated and unilluminated region with a boundary region therebetween comprising:
 a line source of light having a finite thickness;
 a reticle a portion of which defines said boundary region;
 means for focusing said line source onto a portion of said reticle such that said reticle permits transmission of only a portion of light from said line source; and
 reflective focusing means elongated in one dimension so as to have a locus of focal points extending in the direction of said reticle for focusing the light permitted to be transmitted by said reticle at infinity such that an image having an illuminated and unilluminated region and a well defined boundary region therebetween exists over a wide angle at a substantial distance from said apparatus, and further including a colored filter spaced from the portion of said reticle defining said boundary region in a region in the vicinity of said reticle at which light is permitted to pass to said reflective means.

14. Apparatus for projecting over a wide angle an image having an illuminated and unilluminated region with a boundary region therebetween comprising:
 a line source of light having a finite thickness;
 a reticle, a portion of which defines said boundary regions;
 means for focusing said line source onto a portion of said reticle such that said reticle permits transmission of only a portion of light from said line source; and
 reflective focusing means elongated in one dimension so as to have a locus of focal points extending in the direction of said reticle for focusing the light permitted to be transmitted by said reticle at infinity such that an image having an illuminated and unilluminated region and a well defined boundary region therebetween exists over a wide angle at a substantial distance from said apparatus, wherein said reflective focusing means includes a reflective surface forming a portion of a circle in cross section, wherein said reticle is located so as not to obscure light from said reflective focusing means and wherein said reflective surface is tilted towards said reticle by a predetermined angle.

15. The apparatus of claim 14 wherein said predetermined angle is one half the angle subtended by a ray from the portion of the reticle defining said boundary region to the center of said reflective surface and the optical axis of said apparatus.

16. Apparatus for projecting over a wide angle an image having an illuminated and unilluminated region with a boundary region therebetween comprising:
  a line source of light having a finite thickness;
  a reticle, a portion of which define said boundary region;
  means for focusing said line source onto a portion of said reticle such that said reticle permits transmission of only a portion of light from said line source; and
  reflective focusing means elongated in one dimension so as to have a locus of focal points in the direction of said reticle for focusing the light permitted to be transmitted by said reticle at infinity such that an image having an illuminated and unilluminated region and a well defined boundary region therebetween exists over a wide angle at a substantial distance from said apparatus, and further including a housing having reflective side walls located at either end of said elongated reflective focusing means whereby a wide angle image of uniform intensity is projected.

17. The apparatus of claim 16 wherein said side walls are parallel one to the other.

* * * * *